United States Patent [19]

Martin

[11] 3,946,461
[45] Mar. 30, 1976

[54] POULTRY BREAST SECTIONING MACHINE
[75] Inventor: Eugene G. Martin, Ephrata, Pa.
[73] Assignee: Victor F. Weaver, Inc., New Holland, Pa.
[22] Filed: Jan. 6, 1975
[21] Appl. No.: 538,906

[52] U.S. Cl. .................................................. 17/11
[51] Int. Cl.² ........................................ A22C 21/00
[58] Field of Search ............................. 17/11, 1 A

[56] References Cited
UNITED STATES PATENTS

| | | | |
|---|---|---|---|
| 1,943,077 | 1/1934 | Jansen | 17/11 |
| 1,986,195 | 1/1935 | Griffin | 17/11 |
| 2,811,742 | 11/1957 | Jackson | 17/11 |
| 3,564,644 | 2/1971 | Cannon | 17/11 |
| 3,624,863 | 12/1971 | Gasbarro | 17/11 |
| 3,639,945 | 2/1972 | Duncan et al. | 17/11 |
| 3,787,926 | 1/1974 | Schacht | 17/11 |

Primary Examiner—Louis G. Mancene
Assistant Examiner—James D. Hamilton
Attorney, Agent, or Firm—C. Hercus Just; Samuel M. Learned, Jr.

[57] ABSTRACT

A machine designed to automatically section poultry breast members by means of reciprocally operated rotating circular knife blades which respectively engage and selectively section a poultry breast member indexed to and clampably held in cutting position at the respectively selective knife stations in one of three ways; a two-way cut comprised of a single longitudinal severing of a poultry breast member into two halves, or a three-way cut comprised of an initial keel cut of the breast member at one knife station followed by a longitudinal severing into halves of the remainder of the poultry breast member at another knife station, or a four-way cut comprised of an initial transverse severing of the poultry breast member followed by a longitudinal cut at yet another knife station of the two laterally severed breast member sections into halves.

7 Claims, 19 Drawing Figures 3,946,461

POULTRY BREAST SECTIONING MACHINE

BACKGROUND OF THE INVENTION

It is to be understood that the instant invention pertains to a machine for severing the breast members of fowl, including old and young chickens, at least small turkeys, ducks and guineas, but for simplicity, the same are hereinafter defined by the generic term "poultry."

The advent and growth of the convenience food market has given rise to the need for machinery which provides high-speed automatic cutting capabilities for various foodstuffs, particularly poultry, and more particularly chickens, into pieces which are easily prepared and served, as well as providing pieces which comprise a practical portion in terms of amount to be served, in addition to also providing specialty pieces such as all thighs, legs, wings, breasts or the like for commercially prepared food service or restaurant menu features, or retail sales features of loose or packaged fresh or frozen pieces, or packaged pre-cooked convenience meal preparations.

Traditionally, mechanical devices for accomplishing the dissecting of poultry members into multiple pieces for the aforementioned purposes, whether it be the poultry breast member or an eviscerated whole bird carcass, has generally been comprised of relatively simple pivotally mounted shear cutting blade devices, either hand operated as shown in U.S. Pat. No. 1,687,663 to Goldfinger dated Oct. 16, 1928, or foot-treadle operated severing devices as shown in U.S. Pat. No. 2,310,881 to Swanson, dated Feb. 9, 1943. Other poultry carcass and breast splitting means employ rotary disk knives such as those exemplified by the disclosures shown in U.S. Pat. No. 2,169,951 to Hannan, dated Aug. 15, 1939, U.S. Pat. No. 2,957,198 to Cianciolo et al, dated Oct. 25, 1960, U.S. Pat. No. 3,284,846 to Reeves, dated Nov. 15, 1966, and similar rotary disk knife machines disclosed by others wherein a poultry carcass or breast member is severed into component pieces by means of hand manipulating said poultry members, one at a time, into severing engagement with the rotary disk knife.

The most pertinent prior art as regards the instant invention is set forth in the disclosures of Cannon in U.S. Pat. No. 3,564,644 dated Feb. 23, 1971, and Gasbarro in U.S. Pat. No. 3,625,863 dated Dec. 7, 1971, both of which teach machines having the means to automatically and selectively sever poultry breast members into multiple pieces. Albeit, the instant invention is patentably distinguishable over both the Cannon and Gasbarro disclosures, as well as the other disclosures cited hereinbefore in that the instant invention has utility features and new and useful advantages, applications, and improvements in the art of poultry breast splitting not heretofore disclosed, as set forth hereinafter.

SUMMARY OF THE INVENTION

It is the principal object of the instant invention to provide a machine which may be selectively set to automatically cut poultry breast members into halves, thirds, or quarter sections.

It is another object of the instant invention to provide a poultry breast cutting machine incorporating breast holding, clamping, and indexing means whereby said breasts are held and advanced to respective cutting stations for accurate predetermined automatic sectioning into uniform sized pieces.

A further object of the instant invention is to provide a high-speed poultry breast cutting machine which mechanically consolidates breast splitting operations which have heretofore been relatively time-consuming, separate, mechanically or manually accomplished cutting operations.

It is still another object of the instant invention to provide a poultry breast cutting machine which is safe and simple in operation, as well as a machine which requires a minimum of make-ready time in addition to a machine which may be set and operated by an average employee not possessed of special skill or training.

Yet another object of the instant invention is to provide a poultry breast cutting machine which is sanitary in operation and, further, includes a self-contained spray assembly for ease of cleaning and lubricating the knife blades before, during, and after breast cutting operations.

Details of the foregoing objects and of the invention, as well as other objects thereof, are set forth in the following specification and illustrated in the accompanying drawings comprising a part thereof.

DETAILED DESCRIPTION OF THE INVENTION

Figure 1:
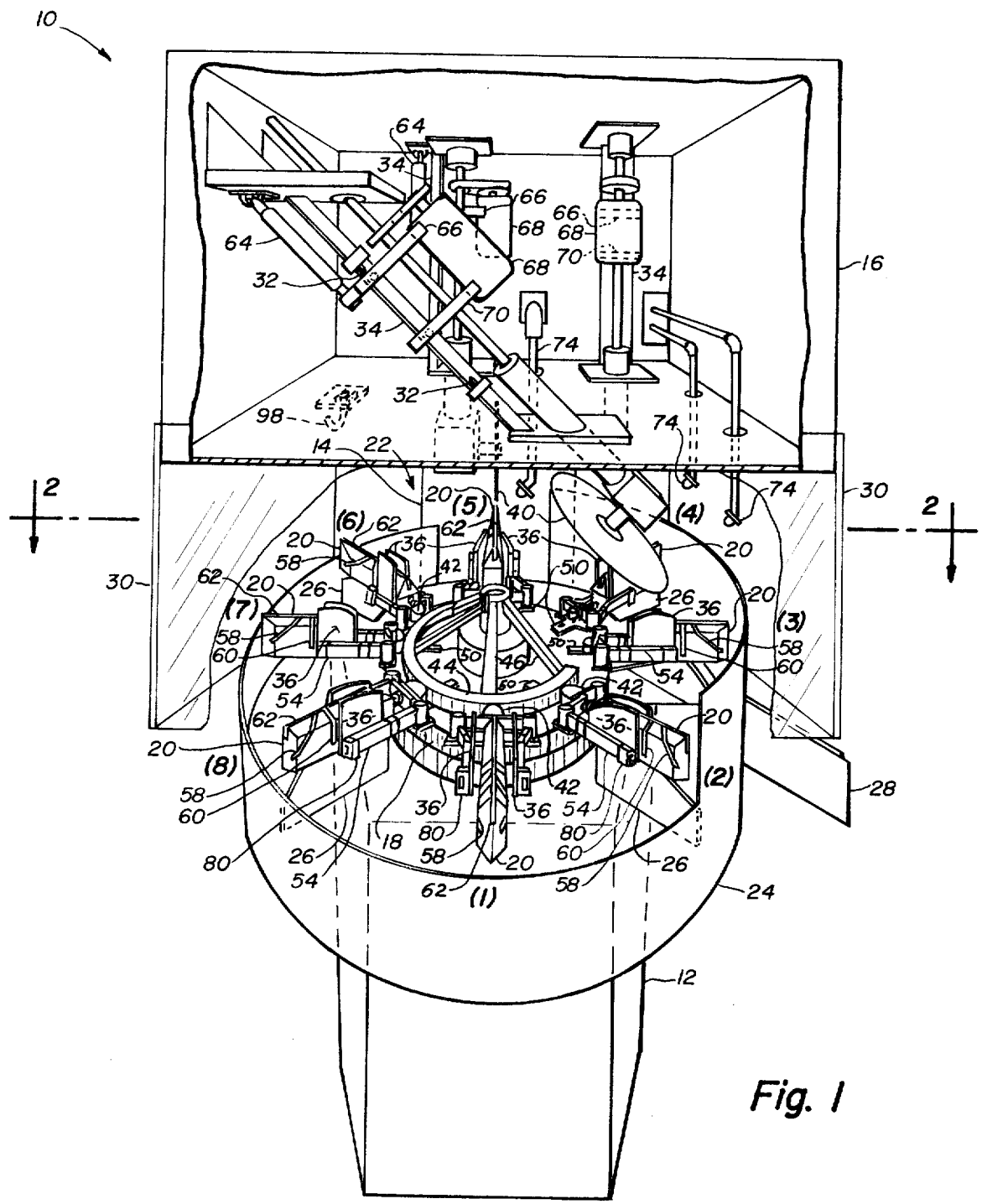
FIG. 1 is a front perspective elevation view of a poultry breast splitting machine embodying the principles of the present invention.
Figure 2:
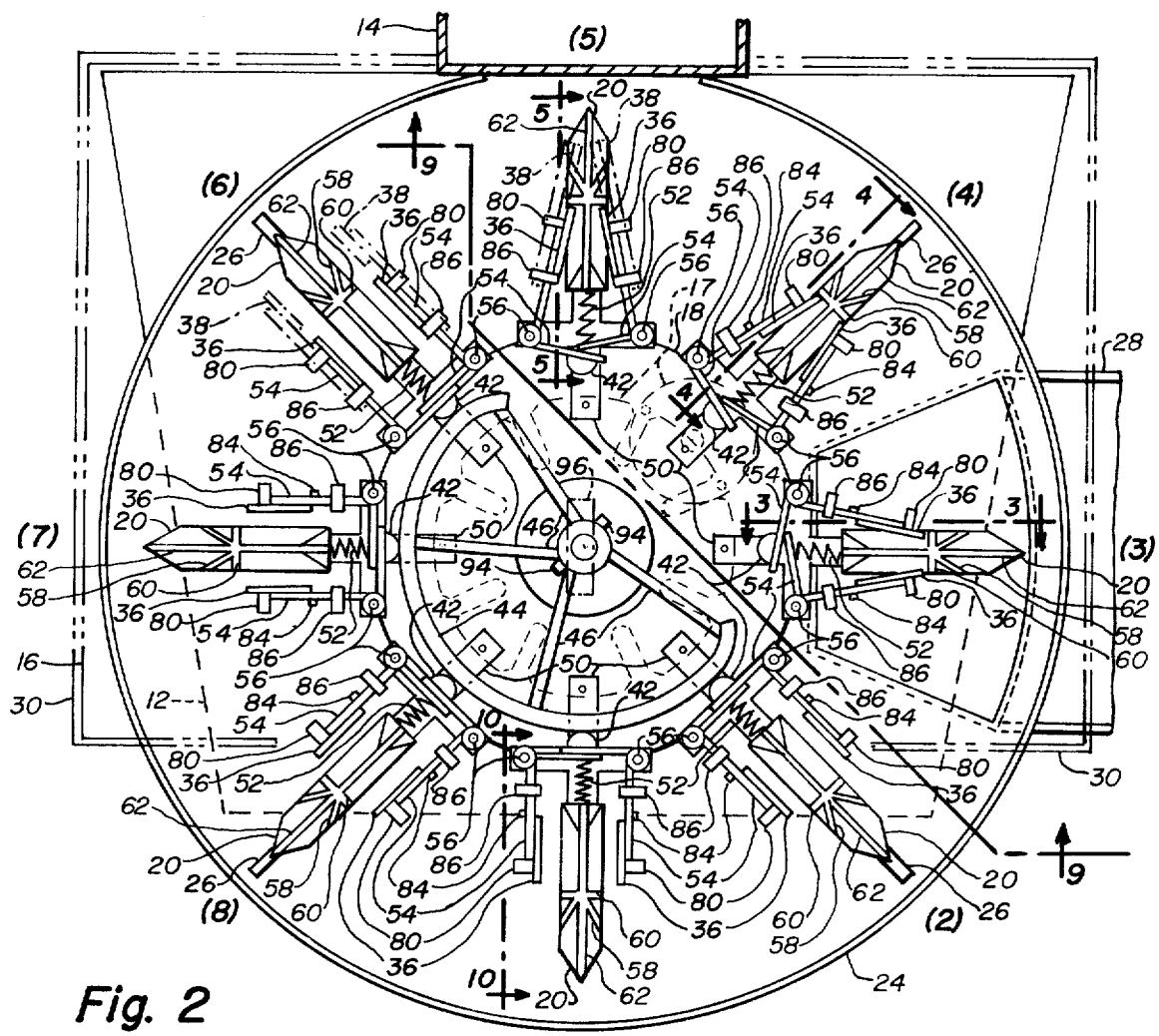
FIG. 2 is an enlarged fragmentary top plan view of the rotary indexing table, cam, poultry breast-carrying saddle members, and Geneva gear indexing drive means as seen generally along the line 2 — 2 of FIG. 1.
Figure 9:
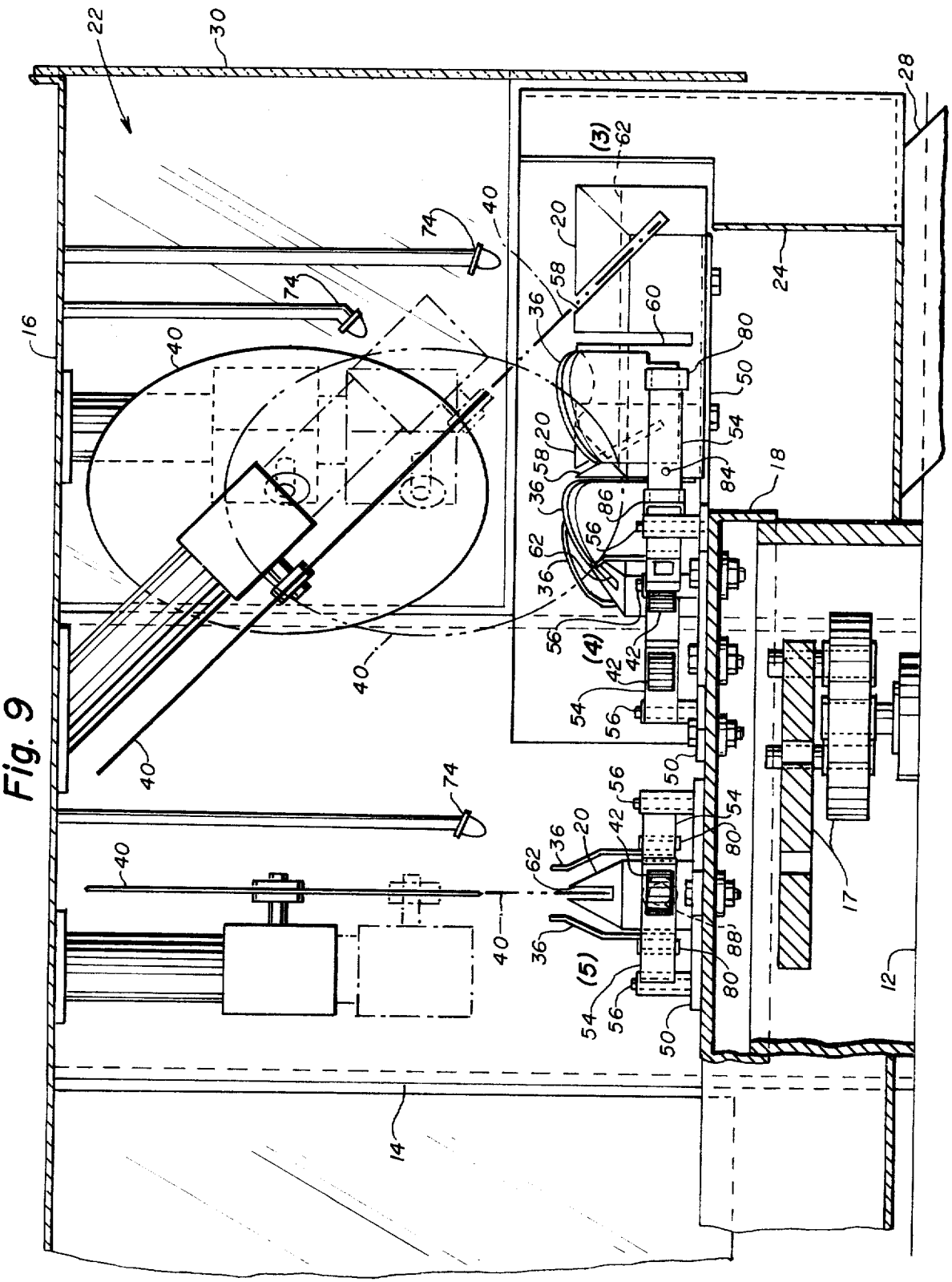
FIG. 9 is an enlarged fragmentary front section elevation of the poultry breast-carrying saddle members, indexing stations, rotating circular knife blade stations, and Geneva gear indexing drive means as seen along the line 9 — 9 of FIG. 2, with the knife blades of all three stations shown in retracted positions as well as additionally, being shown in phantom, in extended position.

Referring to FIG. 1, the present invention is shown which comprises a poultry breast splitting or slitting machine 10 having a support frame structure comprised of a base member 12 that has affixed thereto a rear support member 14 to which, at the upper end thereof, is affixed a motor and cutting assembly support cabinet 16; a Geneva gear drive 17 which for purposes of drawing clarity, is shown in FIGS. 2 and 9, to drive a rotary indexing table 18 having mounted thereon a plurality of poultry breast-carrying saddle members 20 by which means poultry breasts are retained and indexed sequentially to a plurality of knife stations 22 which are selectively operated by automatic control to section poultry breasts into a predetermined number of uniform sized pieces which are either halves, thirds or quarter sections; a dual purpose saftey guard and tray member 24 in which cut poultry breast pieces are collected and moved by transport blades 26 to a delivery chute 28; and, for operator protection, a transparent safety shield 30.

Referring again to FIG. 1 to explain the details of operation of the present invention, prior to which it should be noted that the lot of poultry breasts to be cut and sectioned will have been obtained from fowl of the same species of relatively uniform weight, thereby providing also a relatively uniform breast size to which the machine is set. Normally, although provided with a capability for adjustment, the knife stations 22 are initially set to the maximum cut extension by means of slidably adjusting and locking the knife station limit switches 32 of each respective knife station at the appropriate location along the limit switch adjustment bar 34, thus, practically speaking, eliminating the requirement for any further extension adjustment of the knife stations. Therefore, it becomes not so much the size of the poultry breasts, so long as they are relatively uniform, that is so much determinative of the machine 10 setting procedure as it is the number and type of sectioning cuts to be made.

Controls for the machine 10 are primarily housed in base member 12, but said controls are not shown, the same being well known in the art. Said controls are set to automatically activate the appropriate knife stations depending upon whether the poultry breasts are to be sectioned into two, three, or four pieces. Also, the number of pieces into which the poultry breasts are to be sectioned will determine whether the integral cam-operated poultry breast clamping members 36 will be adequate for retaining poultry breasts upon the poultry breast-carrying saddle members 20 during cutting operations, or whether the extension clamping members 38, which are not shown in FIG. 1 but are illustrated in part in FIG. 2 and certain other subsequent Figures, must be employed. Generally, if the poultry breasts are to be sectioned into thirds, the poultry breast clamping members 36 are employed only; if, however, the poultry breasts are to be sectioned into halves or quarters, the extension clamping members 38 are additionally employed.

Upon setting the machine 10 in accordance with the procedures heretofore described, the operator is ready to commence with sectioning of the poultry breasts to be cut. For purposes of further illustration, the employment of machine 10 to section poultry breasts into thirds will initially be described, which is as follows: The machine 10 is turned on by a master switch, not shown, and the rotary indexing table 18 automatically indexes in a counterclockwise direction so that all poultry breast-carrying saddle members 20 are advanced and located at the next succeeding station position, after which there is an automatic pre-timed indexing stop of said table 18, and the appropriate knife stations 22 thereafter automatically index in extension with the rotary knives 40 thereof extensibly positioned to accomplish the appropriate sectioning cut when a poultry breast is clampably held upon a poultry breast-carrying saddle member 20 by the closed cam-operated poultry breast clamping members 36. Upon completion of the simultaneously occurring cutting cycles of the respective knife stations 22, said knife stations thereafter function to simultaneously retract the respective rotary knives 40 thereof and the rotary indexing table 18 indexes all poultry breast-carrying saddle members 20 counterclockwise successively to the next station position, whereupon another automatic pre-timed indexing stop and cutting cycle is automatically performed as heretofore described, all of which is more clearly illustrated in FIG. 9.

In the actual operation of machine 10, preferably precooked poultry breasts are manually positioned by an operator upon the poultry breast-carrying saddle member 20 at Station 1, which hereinafter as appropriate is indicated on the respective drawings included herewith by the designation (1) — as will other operational station hereinafter described be likewise respectively designated by an appropriate number symbol, while the cam-operated poultry breast clamping members 36, pivotally connected to the poultry breast-carrying saddle member mounting bracket 50 located at Station 1 (seen only at Stations 3 and 4 in FIG. 1), are in the open position.

Figure 19:
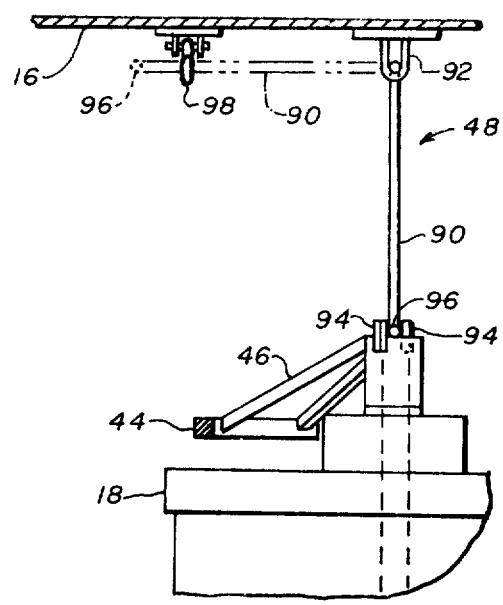
FIG. 19 is a fragmentary side elevation of the rotary indexing table showing the cam torque retention bar assembly in torque retention position as well as, in phantom, being shown in retracted position.

Operation of the respective poultry breast clamping members 36 is effected by engagement of a spring-loaded cam-follower 42 with cam 44, the details of operation of which will be more fully explained in the description of FIG. 2, said cam 44 being supported by a removable cam support assembly 46 which is held in operational position by a retractable cam torque retention bar assembly 48, said retractable cam torque retention bar assembly 48, for purposes of drawing clarity, not being shown in FIG. 1, but seen in FIG. 19. The manner of positioning poultry breasts upon poultry breast-carrying saddle members 20, although not illustrated in FIG. 1, but shown in FIG. 3 and subsequent Figs. is with the so-called "keel" end of said breasts pointing toward the operator side of the machine 10 with the tip end of said keel in vertical alignment with the end of said breast carrying saddle members 20 nearest the operator and the longitudinal vertical dimension of said saddle member 20 bisecting the interior opening of said breast with the uppermost longitudinal horizontal surface of said saddle member 20 in contiguous supportable contact with the uppermost longitudinal interior surface of the breast cavity and the respective sides thereof depending along the respective longitudinal vertical side surfaces of said saddle member 20.

The aforementioned automatic pre-timed indexing stop of the poultry breast-carrying saddle member 20 at Station 1 is of sufficient duration to enable an operator to position a poultry breast upon said saddle member 20 as heretofore described. The rotary indexing table 18 then automatically indexes in a counterclockwise direction so that all saddle members 20 are re-positioned at the next successive counterclockwise Station location, i.e., the poultry breast which was manually positioned upon saddle member 20 at Station 1 is advanced to Station 2, and the operator positions another poultry breast upon the vacant saddle member 20 advanced to Station 1 from Station 8 as a result of the indexing cycle. Each time the rotary indexing table 18 completes a counterclockwise indexing cycle, the operator positions a poultry breast upon the vacant saddle member 20 advanced to Station 1 from Station 8.

The Station 2 location is a staging position, being that Station immediately before the first knife station, i.e., Station 3, which is the initial knife station to automatically complete the first poultry breast cut during the following automatic pretimed indexing stop when the machine 10 is set to section poultry breasts into thirds. The mechanical configuration of the poultry breast clamping members 36 as well as the poultry breast previously positioned upon the saddle member 20 at Station 1 is the same at Station 2, i.e., the spring-loaded cam-follower 42 remains in compressible contact with the cam 44 and the poultry breast clamping members 36 remain in the open position. However, upon the next succeeding counterclockwise indexing cycle, as the poultry breast-carrying saddle member 20 is indexed to Station 3, the spring-loaded cam-follower 42 rides off the cam 44 and the saddle member compression spring 52, not seen in FIG. 1, but, however, seen in FIG. 2 and certain of subsequent Figs. extends, causing spring tension on the angled clamping member lever arms 54 resulting in the poultry breast clamping members 36 respectively pivotally rotating about pins 56 towards the saddle member 20 and clampably engaging the respective depending sides of the poultry breast positioned thereon prior to the automatic pre-timed indexing stop occurring at Station 3 where the first automatic sectioning cut is accomplished when said poultry breast is being sectioned into thirds.

At this point it should be explained that the poultry breast-carrying saddle members 20 contain three slots, the angled saddle member slot 58 receiving the rotary knife 40 of Station 3 as said knife passes through the poultry breast clampably held upon saddle member 20 and completes a "keel cut," the lateral saddle member slot 60 receiving the rotary knife 40 of Station 4 as that knife passes through the poultry breast clampably held upon saddle members 20 and completes a transverse halving cut, and the longitudinal saddle member slot 62 receiving the rotary knife 40 of Station 5 as that knife passes through the poultry breast clampably held upon saddle member 20 and completes a longitudinal halving cut. By means of the aforementioned saddle member slots, the rotary knives 40 at the respective knife stations 22 automatically complete poultry breast sectioning cuts without engaging any surfaces of the saddle members 20 as is best illustrated in FIG. 9.

Upon counterclockwise indexing of the poultry breast-carrying saddle member 20 from Station 2 to Station 3, as heretofore described, poultry breast-clamping members 36 clampingly engage and securely hold the poultry breast positioned on saddle member 20 during the indexing transit of the same between Stations 2 and 3 and prior to the initiation of the keel cut cycle by rotary knife 40 located at Station 3. It will be noted that the Station 3 as illustrated in FIG. 1, but more clearly shown in FIG. 9, is positioned to make an approximate 45° sectioning cut, being the keel cut as earlier mentioned and also illustrated in FIG. 3. When the last mentioned counterclockwise indexing cycle of rotary indexing table 18 has been completed, and during the interim automatic pre-timed indexing stop prior to the next indexing cycle of rotary indexing table 18, the rotary knive 40 of Station 3 is automatically extended by means of pneumatic cylinder 64 affixed to the upper motor mount member 66 of motor 68 until the lower motor mount member 70, also affixed to motor 68, engages the lower limit switch 32 which is securely affixed to the limit switch adjustment bar 34, as earlier explained, at which time the cutting of the poultry breast section known as the keel cut is completed. The rotary knife 40 is retracted by pneumatic cylinder 64 to the start position, at which time the keel cut section of the breast falls into the safety guard and tray member 24 and is thereafter engaged by a transport blade 26 during subsequent counterclockwise indexing cycles of rotary indexing table 18 and thereby moved to the delivery chute 28 for delivery to subsequently accomplished separate grading and packing operations. It should be noted that a water spray nozzle 74 is provided at each respective knife station 22, and a fine water-mist spray is directed therefrom onto the rotary knives 40 for purposes of lubricating said knives 40 during cutting of poultry breasts, as well as for cleaning said knives between cuts.

The balance of the pountry breast, namely that which remains after the keel cut is clampably retained upon saddle member 20 by clamping members 36, and upon the next automatically intiated counterclockwise indexing cycle of rotary indexing table 18 the subject saddle member 20 is indexed to Station 4. Since the Station 4 knife station 22 accomplishes a lateral transverse halving cut of a poultry breast, which is not a cut involved in the sectioning of a poultry breast into thirds, the Station 4 knife station 22 cutting function is excluded from the operational sequence during the previously described setup procedure. Therefore, in the cutting function programming of machine 10 to section a poultry breast into thirds, the Station 4 knife station 22 does not operate, and under this circumstance the Station 4 location serves as a staging position for the Station 5 location. It should be pointed out, however, that during the staging positon pretimed indexing stop of the subject saddle member 20 at Station 4, another keel cut sectioning of a poultry breast is being automatically accomplished at Station 3.

Upon the next counterclockwise indexing cycle of rotary indexing table 18, the subject saddle member 20 is positioned at the Station 5, and during the automatic pre-timed indexing stop at said Station, the knife of the same functions in a mechanically similar manner to that previously described for the knife operation at Station 3, to complete a vertical longitudinal cut and section the balance of the poultry breast into two equal longitudinal halves. After retraction of the rotary knife 40 of Station 5, and completion of the automatic pre-timed indexing stop duration, the subject saddle member 20 is carried by rotary indexing table 18 through another counterclockwise indexing cycle to Station 6. Again, it should be pointed out that simultaneous with the sectioning operation at Station 5 during the automatic pretimed indexing stop another keel cut sectioning operation is being accomplished at Station 3.

Figure 7:
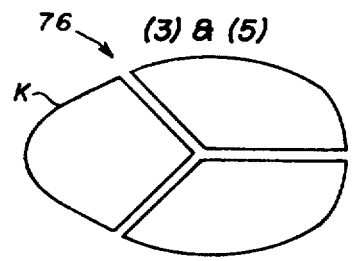
FIG. 7 is a top plan view of an exemplary poultry breast showing the component breast pieces obtained from a 3-way cut.

As the subject saddle member 20 affixed to rotary indexing table 18 advances counterclockwise to Station 6, the spring-loaded cam-follower 42 of said saddle member 20 engages cam 44 and in so doing compresses the saddle member compression spring 52, thereby causing the angled clamping member lever arms 54 to be forced towards the subject saddle member 20 and respectively pivotally rotate about pins 56 to open the poultry breast clamping members 36 and release the halved sections of the balance of the poultry breast for deposit in the safety guard and tray member 24, said halved sections to therafter also be engaged by a transport blade 26 during subsequent counterclockwise indexing of rotary indexing table 18 and thereby be moved to the delivery chute 28 for delivery to subsequently accomplished separate grading and packing operations. Thus the sectioning of a poultry breast into thirds by means of employing machine 10 is completed, the resultant product of which is illustrated in FIG. 7. It will be noted that the poultry breast clamping members 36 remain in an open position during indexing of the subject saddle member 20 through Stations 7 and 8, said saddle member 20 thereafter being indexed to Station 1 where the operator manually positions another poultry breast upon the saddle member as heretofore described.

Figures 3, 4:
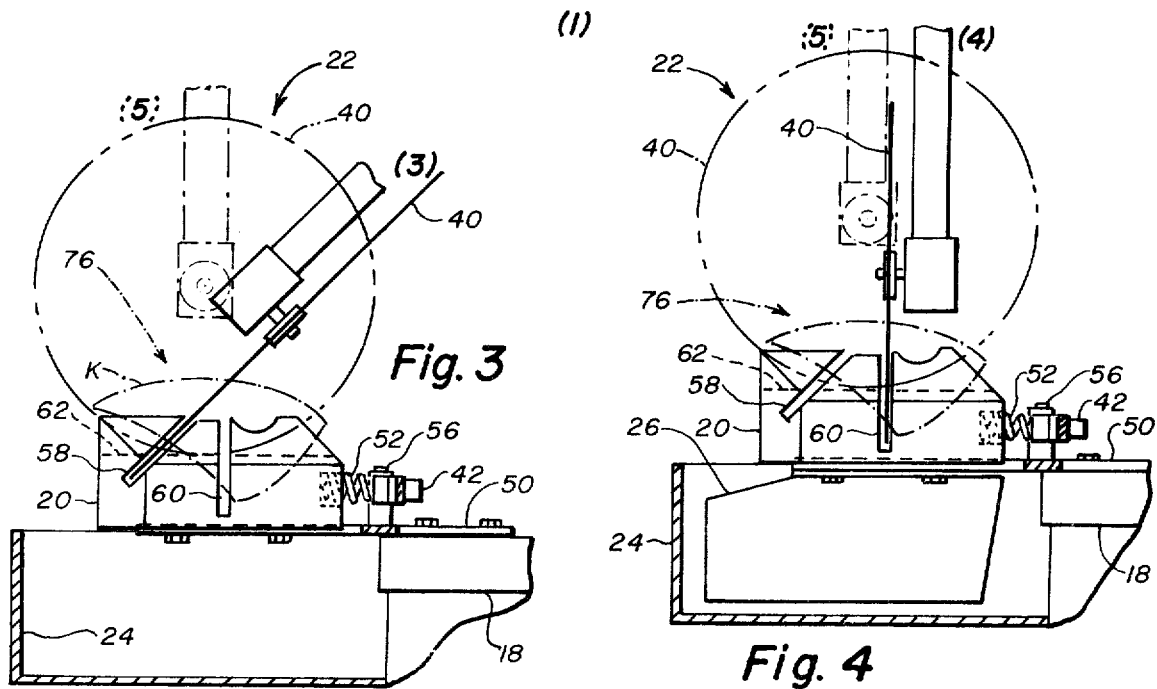
FIG. 3 is an enlarged fragmentary side elevation of a poultry breast-carrying saddle member as seen along the line 3 — 3 of FIG. 2, showing an exemplary poultry breast member in phantom with respective blade members also shown in relative respective position with regard to the breast and saddle members whereby a 3-way cut of said breast member is made.
FIG. 4 is an enlarged fragmentary side elevation similar to the view seen in FIG. 3, except taken along the line 4 — 4 of FIG. 2 and showing a 4-way cut of an exemplary poultry breast member.
Figure 8:
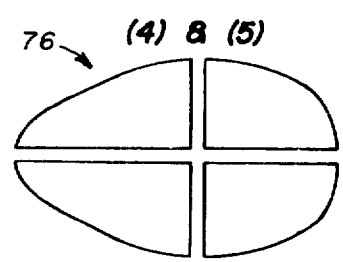
FIG. 8 is a top plan view of an exemplary poultry breast showing the component breast pieces obtained from a 4-way cut.

The cutting of a poultry breast into quarter sections, as illustrated in FIG. 4, with the resultant product thereof being illustrated in FIG. 8, is accomplished in the same manner as described for sectioning a poultry breast into thirds, except that extension clamping members 38 are additionally employed to hold the keel half of the poultry breast upon the poultry breast carrying saddle member 20 after the first transverse cut by rotary knife 40 at Station 4 which sections the poultry breast into transverse halves prior to the longitudinal quartering cut of the transverse halves by rotary knife 40 of Station 5. At Station 6 the quartered sections are released from being clampably held upon saddle member 20 and are deposited in the safety guard and tray member 24 for movement by means of a transport blade 26 to delivery chute 28. It will be noted that in the machine 10 setup for accomplishing quartering cuts the cutting function of Station 3 would have been earlier excluded from the operational sequence during the setup procedure.

Figure 5:
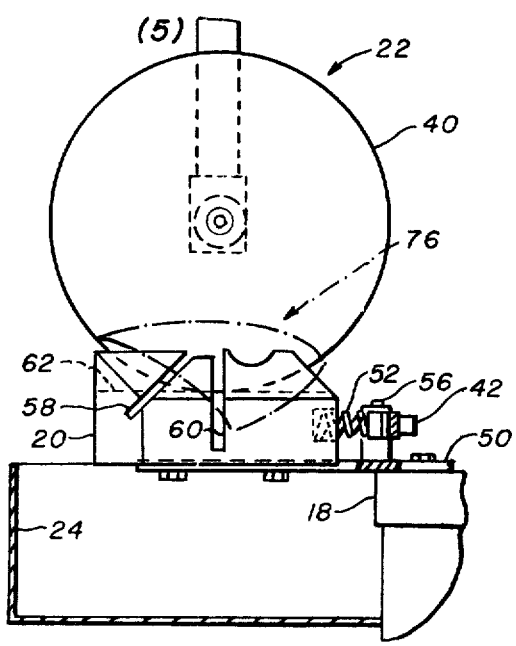
FIG. 5 is an enlarged fragmentary side elevation similar to the views seen in FIGS. 3 and 4, except taken along the line 5 —5 of FIG. 2 and showing a 2-way cut of an exemplary poultry breast.
Figure 6:
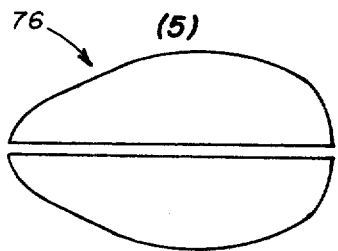
FIG. 6 is a top plan view of an exemplary poultry breast showing the component breast pieces obtained from a 2-way cut.

The cutting of a poultry breast into longitudinal half sections, as illustrated in FIG. 5, with the resultant product thereof being illustrated in FIG. 6, is also accomplished in the same manner as previously described for sectioning a poultry breast into quarters, i.e., the extension clamping members 38 are employed, except that the rotary knife 40 of Station 5 is the only knife station employed. Therefore, in the setup procedure of machine 10 for accomplishing a longitudinal halving cut of a poultry breast, both the Station 3 and Station 4 cutting functions would have been earlier excluded from the operational cutting sequence.

The machine 10 as disclosed in FIG. 1 preferably is constructed of metal and plastic, but any other suitable materials of combinations thereof may be used.

Referring to FIG. 2, which is an enlarged fragmentary top plan viw of machine 10, as seen along the line 2 — 2 of FIG. 1, it shows in greater detail the rotary indexing table 18 and the component mechcanically functional elements thereof. Also shown are component elements of machine 10 heretofore described and explained, but which were not readily or easily illustratable in FIG. 1, as well as showing in more particular detail the plan relation of the respective poultry breast-carrying saddle members 20 one to the other and the positional functioning of the poultry breast clamping members 36 with regard to the cam 44.

In FIG. 3 an examplary poultry breast 76 is shown in phantom positioned upon an enlarged fragmentary side elevation of the poultry breast-carrying saddle member 20 as seen along the line 3 — 3 of FIG. 1, and also shown in phantom is rotary knife 40 of Station 5, whereby the illustration shows how the respective knife stations 22 located at Station 3 and Station 5 cooperate to section a poultry breast into thirds, with the keel cut section being designated by the letter "K." The poultry breast sections resultant from cutting a poultry breast into thirds with machine 10 are as illustrated in FIG. 7.

In FIG. 4 an exemplary poultry breast 76 is shown, in phantom, positoned upon an enlarged fragmentary side elevation of the poultry breast-carrying saddle member 20 as seen along the line 4 — 4 of FIG. 1, and also shown in phatnom is rotary knife 40 of knife station 22 at Station 5, whereby the illustration shows how the respective knife stations 22 located at Station 4 and Station 5 cooperate to section a poultry breast into quarters. It will also be noted that FIG. 4 shows a transport blade 26 affixed to the underside of the poultry breast-carying saddle member mounting bracket 50. The poultry breast sections resultant from cutting a poultry breast into quarters with machine 10 are as illustrated in FIG. 8.

In FIG. 5 an exemplary poultry breast 76 is shown in phanatom positoned upon an enlarged fragmentary side elevation of the poultry breast-carrying saddle member 20 as seen along the line 5 — 5 of FIG. 1, whereby the illustration shows how the knife station 22 located at Station 5 sections a poultry breast into halves. The poultry breast sections resultant from cutting a poultry breast into longitudinal halves with machine 10 are as illustrated in FIG. 6.

Although there is no apparent current commercial demand or market for poultry breasts sectioned laterally into transverse halves, as accomplished at Station 4 as previously described, it should be noted that machine 10 of the instant invention has the mechanical and setup capabilities to automatically accomplish a lateral cut and deliver transverse poultry breast halves.

The view seen in FIG. 9 is an enlarged fragmentary front sectional elevation as seen along the line 9 — 9 of FIG. 1, and shows in greater perspective detail the respective knife stations 22 located at Stations 3, 4, and 5. Also shown in phantom are the extensions of rotary knives 40 of the respective knife stations 22, illustrating how said knives 40 respectively enter saddle member slots 58, 60 and 62 of poultry breast-carrying saddle members 20 during poultry breast cutting and sectioning operations. Also shown in greater detail in FIG. 9 is the exemplary Geneva gear drive 17 as well as the respective knife station 22 water spray nozzles 74, but it is to be understood that other comparable driving means may be employed to perform the indexing movements of table 18.

Figure 10:
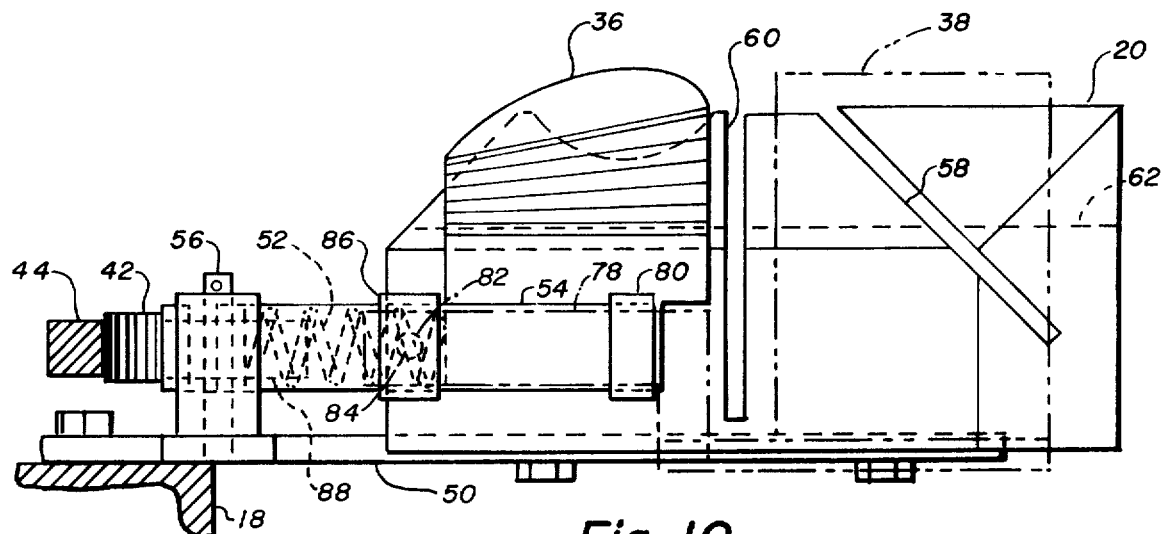
FIG. 10 is an enlarged side elevation of a poultry breast carrying saddle member as seen along the line 10 — 10 of FIG. 2 showing details of the component assembly with the poultry breast clamping members being shown in the open position and the extension clamping members being shown in phantom.
Figure 11:
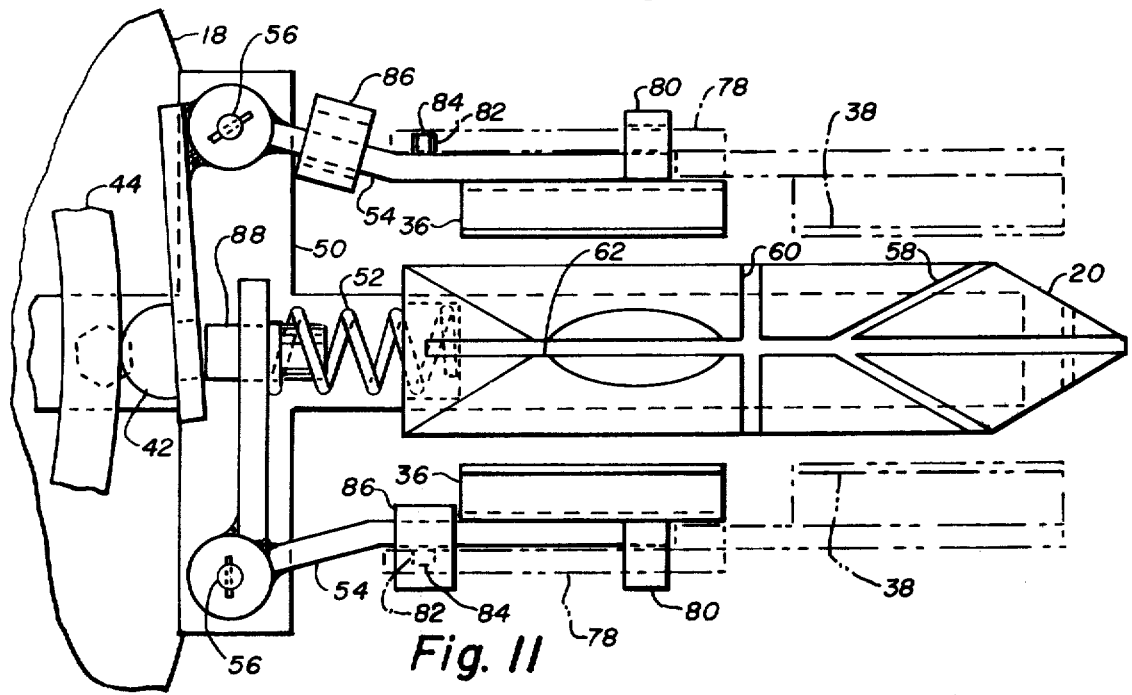
FIG. 11 is a top plan view of a poultry breast carrying saddle member corresponding to the enlarged side elevation shown in FIG. 10.
Figure 12:
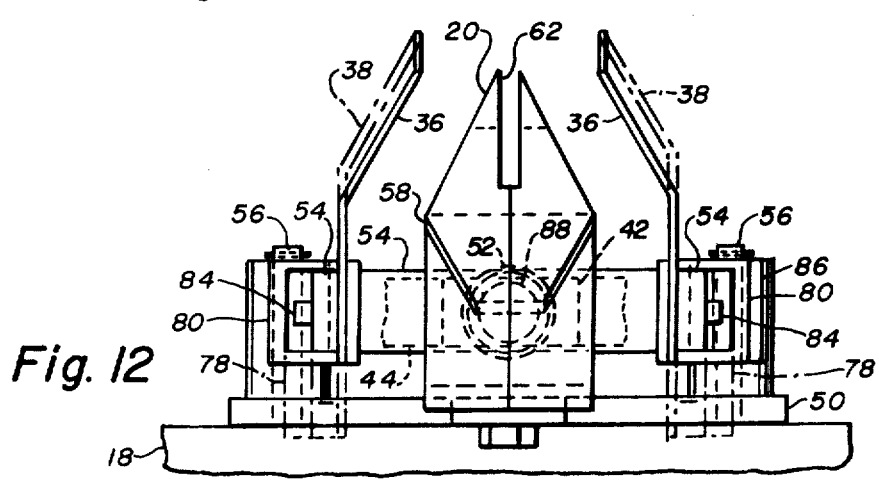
FIG. 12 is an end view of a poultry breast carrying saddle member also corresponding to the enlarged side elevation shown in FIG. 10.

The series of illustrations seen in FIGS. 10, 11, and 12 respectively show enlarged fragmentary side, top, and end views of a poultry breast-carrying saddle member 20 with the poultry breast clamping members 36 shown in the open position, and extension clamping members 38 shown in phantom. Particularly shown in these views is the means for installing detachable extension clamping members 38 to the poultry breast clamping members 36, i.e., by inserting the extension clamping member leg 78 through the slot of the stationary poultry breast clamping member bracket 80 until the opening 82 in said extension clamping member leg 78 engages the poultry breast clamping member detend 84, after which the slidable poultry breast clamping member collar 86 is moved over the detent/opening connection. Also shown in FIGS. 10, 11, and 12 is the saddle member compressison spring retention dog 88.

Figure 13:
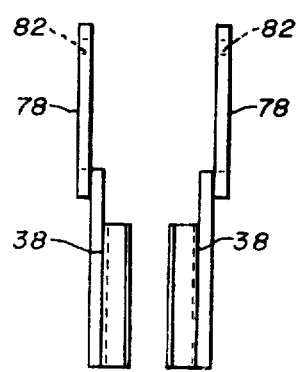
FIG. 13 is a top plan view of a pair of extension clamping members.
Figure 14:
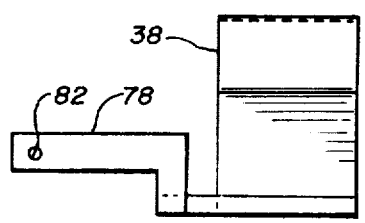
FIG. 14 is a side view of the extension clamping members shown in FIG. 13.
Figure 15:
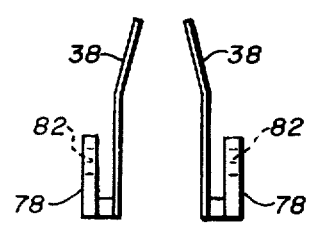
FIG. 15 is an end view of the extension clamping members shown in FIG. 13.

The series of illustrations seen in FIGS. 13, 14, and 15 respectively show top, side, and end views of a pair of extension clamping members 38.

Figure 16:
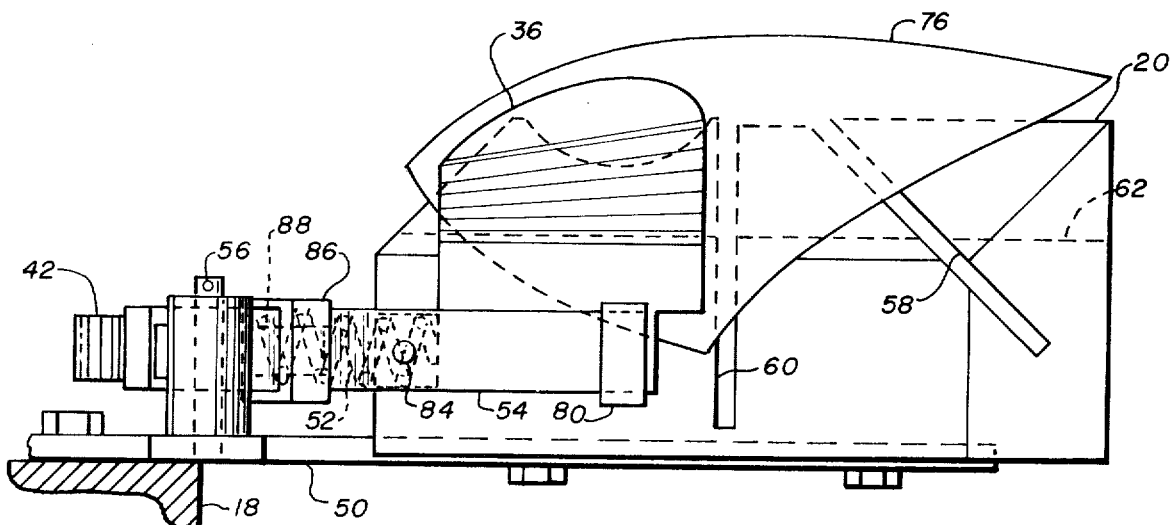
FIG. 16 is an enlarged side elevation of a poultry breast-carrying saddle member similar to the one shown in FIG. 10, but, however, showing an exemplary poultry breast secured to said saddle member with the poultry breast clamping members thereof in closed position.
Figure 17:
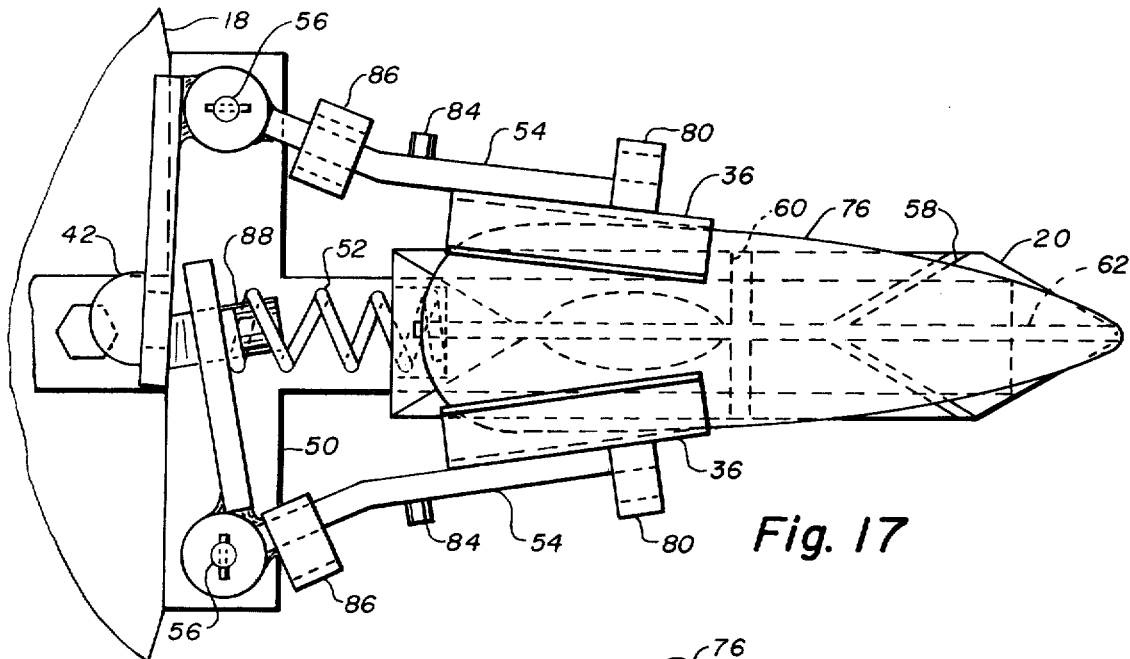
FIG. 17 is a top plan view of the poultry breast-carrying saddle member shown in FIG. 16.
Figure 18:
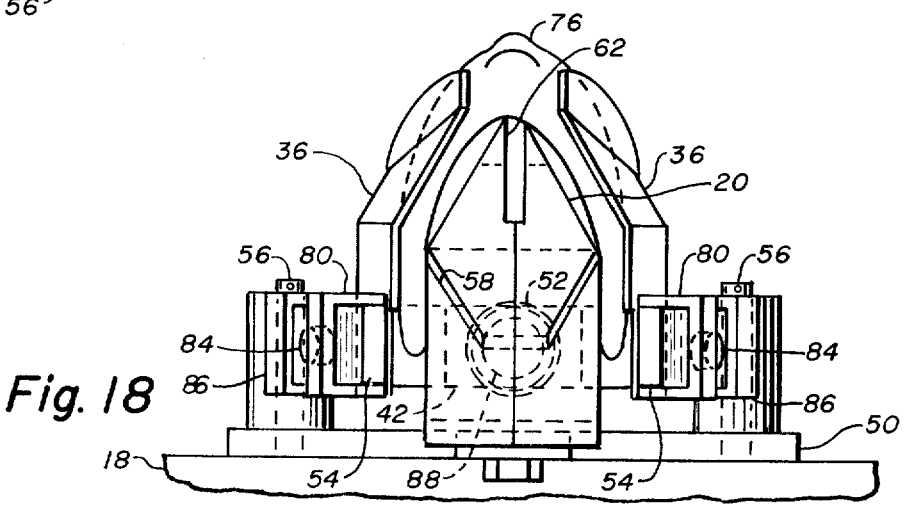
FIG. 18 is an end view of the poultry breast-carrying saddle member shown in FIG. 16.

The series of illustrations seen in FIGS. 16, 17, and 18 respectively show enlarged fragmentary side, top, and end views of a poultry breast-carrying saddle member 20 with an exemplary poultry breast 76 clampably held thereon by poultry breast clamping members 36 which are shown in the closed position.

In FIG. 19 there is seen a fragmentary side elevation of the retractable cam torque retention bar assembly 48, the function of which is to prevent rotation of the removable cam 44 and cam support assembly 46 during employment of machine 10 in performing poultry breast cutting and sectioning operations. The retractable cam torque retention bar assemby 48 is comprised of a cam torque retention bar 90 which depends from a cam torque retention bar mounting bracket 92 and retainably engages the cam support assembly lugs 94 of the cam support assembly 46 by means of retaining pin 96. When not in use, or during cleaning of machine 10, the cam torque retention bar 90 is lifted vertically to desengage the retaining pin 96 from the cam support assembly lugs 94, and said bar 90 is pivotally swung to a horizontal position, as also shown in phantom, and is there retained by bracket 98, thereby also allowing removal of the cam support assembly 46 during cleaning operations.

While the invention has been described and illustrated in its several preferred embodiments, it should be understood that the invention is not to be limited to the precise details herein illustrated and described since the same may be carried out in other ways falling within the scope of the invention as illustrated and described.

We claim:

1. A machine for selectively sectioning the breasts of poultry into multiple pieces, said machine comprising in combination, a supporting frame structure having a loading station and a plurality of cutting stations and a discharge station, a horizontal supporting table mounted upon said frame for rotation about a vertical axis, a plurality of saddle members connected to said table at circumferentially spaced positions in position respectively for receiving at said loading station a poultry breast in a draped manner with the sides of said breast draped downwardly and automatically supported thereby for sequential indexing to said plurality of cutting stations, said saddle members each having a plurality of slots therein extending downward from the upper surfaces thereof and intersecting each other and corresponding to patterns of pieces into which said breasts may selectively be cut, said saddle members each having additionally affixed thereto a set of clamping members aligned with unslotted areas of said saddle members and respectively pivotally attached to each saddle member adjacent opposite sides thereof and mounted operably to engage said opposite draped sides of a breast and secure the same on said saddles during cutting operations, a cam fixed to said supporting frame, cam-followers on said clamping members engageable with said cam at said loading station to space said clamping members from said saddle members to permit mounting breasts thereon and said cam-followers disengaging said cam to permit movement of said clamping members against the draped sides of said breasts when said table moves toward said cutting stations, means engageable with said clamping members to move the same automatically as aforesaid, a plurality of angularly positioned rotatable knife blades respectively mounted above said table at said cutting stations cirumferentially spaced about said vertical axis of said table and each supported and selectively operable sequentially and respectively for reciprocating movement toward and from one of said slots in said saddle members in selectable sequence with each other, and means operable sequentially to move said table to carry said saddle members in registry with said cutting stations respectively adjacent said knife blades, whereby a poultry breast thereby is automatically and accurately positioned for cutting into either halves or thirds or quarters.

2. A machine for selectively sectioning the breasts of poultry into multiple pieces in accordance with claim 1 in which said means engageable with said clamping members to move the same against the draped sides of said breasts comprise spring means automatically operable to close the same against said draped sides of a poultry breast member when positioned upon said saddle member prior to the first cut being made and said cam being engaged by said cam-followers to automatically move said clamping members to open position after the last cut has been completed.

3. A machine for selectively sectioning the breasts of poultry into multiple pieces in accordance with claim 3 in which said clamping members have pivoted ends and toggle members on said pivoted ends have said cam followers thereon slidably engaging said stationary cam and thereby automatically being operable to close and open said clamping members.

4. A machine for selectively sectioning the breasts of poultry into multiple pieces in accordance with claim 2, wherein said clamping members additionally have extension clamps detachably connectable thereto to engage and hold said breasts when the same are to be severed longitudinally into halves or longitudinally and transversely into quarters.

5. A machine for selectively sectioning the breasts of poultry into multiple pieces in accordance with claim 4, wherein said extension clamps respectively are spaced from one end of said clamping members to provide an unobstructed passage for the transverse cutting knife blade therebetween.

6. A machine for selectively sectioning the breasts of poultry into multiple pieces in accordance with claim 1, wherein the rotatably-operable knife blades operably mounted respectively at said cutting stations comprise a first knife to slit said breasts transversely and at an angle to the longitudinal axis of said breasts, a second knife to slit said breasts longitudinally along the central axis thereof, and a third knife to slit said breasts transversely and intermediately the ends of said breasts, and further including control and actuating means at each of said three cutting stations operable to cause reciprocating movement of said knives toward and from said breasts for selectively performing said aforementioned cutting operations.

7. A machine for selectively sectioning the breasts of poultry into multiple pieces in accordance with claim 6, wherein each respective cutting station further includes a piston member and power means operable reciprocally to advance and withdraw said piston member relative to said saddle members, said rotatably-operable knife blades respectively being supported rotatably by said piston member adjacent the outer ends thereof, whereby said blade cuts through a breast positioned and clampably retained upon an indexed saddle member and is received within a complementary slot in said saddle member.

* * * * *